United States Patent
Li et al.

(10) Patent No.: US 7,580,635 B2
(45) Date of Patent: Aug. 25, 2009

(54) METHOD, APPARATUS AND SYSTEM FOR OPTICAL COMMUNICATIONS

(75) Inventors: Weishi Li, Guangdong (CN); Qianjin Xiong, Guangdong (CN); Jun Luo, Guangdong (CN); Tianhai Chang, Guangdong (CN); Dianjun Xiao, Guangdong (CN); Yuzhi Jin, Guangdong (CN); Naisheng Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 11/485,975

(22) Filed: Jul. 14, 2006

(65) Prior Publication Data

US 2007/0031148 A1   Feb. 8, 2007

Related U.S. Application Data

(63) Continuation of application No. PCT/CN2004/001052, filed on Sep. 16, 2004.

(30) Foreign Application Priority Data

Jan. 15, 2004   (CN)   ................. 2004 1 0003052

(51) Int. Cl.
*H04J 14/00* (2006.01)
*H04B 10/00* (2006.01)
(52) U.S. Cl. .............................. 398/46; 398/54; 398/74; 398/155
(58) Field of Classification Search .................... 398/46, 398/47, 54, 73–75, 155
See application file for complete search history.

(56) References Cited

U.S. PATENT DOCUMENTS 5,111,322 A   5/1992   Bergano et al.

(Continued)

FOREIGN PATENT DOCUMENTS

RU   2 146 853 C1   3/2000

(Continued)

OTHER PUBLICATIONS

Karlsen, P. et al. "GaAS MMIC Demodulator Using a Distributed Mixing Principle for High-Sensitivity 5Gbit/s CPFSK Receiver" Electronics Letters; Jan. 5, 1995 vol. 31 No. 1 pp. 54-55.

(Continued)

*Primary Examiner*—Dalzid Singh
(74) *Attorney, Agent, or Firm*—Brinks Hofer Gilson & Lione

(57) ABSTRACT

The present invention discloses an optical communication system, a sub-rate multiplexing/de-multiplexing apparatus and the method thereof such that the optical communication system could meet the demand of Metropolitan Area Network (MAN) communications using the existing optical fiber network. This optical communication system includes an optical transmitting module and an optical receiving module connected by optical fibers, wherein the optical transmitting module is used for converting the inputted electrical signals into optical signals and transferring the optical signals to the optical receiving module via optical fibers, and the optical receiving module is used for converting the received optical signals into electrical signals and outputting the electrical signals. In the optical signals transferred by optical fibers, the data transmission rate of at least one wavelength is about 5 Gb/s. One or multiple optical amplifiers may be incorporated as well between the optical transmitting module and the optical receiving module.

9 Claims, 12 Drawing Sheets

U.S. PATENT DOCUMENTS

| | | | |
|---|---|---|---|
| 5,809,190 A * | 9/1998 | Chen | 385/43 |
| 6,965,619 B2 * | 11/2005 | Bisson et al. | 370/543 |
| 7,099,584 B1 * | 8/2006 | Narvaez et al. | 398/58 |
| 7,227,875 B2 * | 6/2007 | Deng | 370/474 |
| 7,245,633 B1 * | 7/2007 | Mueller | 370/466 |
| 2002/0065073 A1 * | 5/2002 | Natani et al. | 455/422 |
| 2003/0026298 A1 | 2/2003 | Bisson et al. | |
| 2003/0035445 A1 * | 2/2003 | Choi | 370/535 |
| 2003/0048813 A1 | 3/2003 | Lahav et al. | |

FOREIGN PATENT DOCUMENTS

| | | |
|---|---|---|
| WO | WO 02/45297 A2 | 6/2002 |

OTHER PUBLICATIONS

Laner, D. S. "GBIT/S and Beyond" INSPEC Conference Proceedings Article; Jan. 1, 1989 pp. 8/1-8/7.

Liang, "Che-fu" "A 20/10/5/2.5Gb/s Power-Scaling Burst-Mode CDR Circuit UsingGVCO/Div2/DFF Tri-Mode Cells" Solid-States Circuit Conference 2008. ISSCC 2008. Digest of Technical Papers. IEEE International, Piscataway, NJ, USA, Feb. 3, 2008; pp. 224-225 and 608.

Office Action issued in corresponding European Application No. 04 762 186.7; issued Feb. 12, 2009.

Office Action issued in corresponding Canadian Patent Application No. 2,550,618; issued Mar. 4, 2009.

* cited by examiner

METHOD, APPARATUS AND SYSTEM FOR OPTICAL COMMUNICATIONS

CROSS-REFERENCE TO RELATED APPLICATIONS

This is a continuation of International Application No. PCT/CN2004/001052, filed on Sep. 16, 2004, published as WO 2005/071869, published date Aug. 4, 2005, which designated the United States; which claims priority of Chinese Patent Application No. 200410003052.0, filed Jan. 15, 2004, the disclosure of each application is hereby incorporated by reference in their entirety.

FIELD OF THE TECHNOLOGY

The present invention relates to optical communication technologies, and more particularly, to a data transmission method, a multiplexing/de-multiplexing apparatus and an optical communication system using the apparatus applicable to a Metropolitan Area Network (MAN).

BACKGROUND OF THE INVENTION

Synchronous Digital Hierarchy (SDH) is a digital communication hierarchy in optical fibre communication systems and an international standard officially recommended by International Telecommunication Union Telecommunication Standardization Sector (ITU-T) in 1988. SDH is both a networking principle and a multiplexing method. Based on SDH, a flexible, reliable, and remotely-controllable nationwide and even world-wide telecommunication network may be constructed. This network can make it easy to provide new services while making equipment produced by different manufacturers compatible with each other.

There has been no unified international standard for previous optical communication systems, and different countries have developed different systems, respectively, which are referred to as Plesiochronous Digital Hierarchy (PDH). As a result, the transmission rate of signals, the type of line codes, the interface standards and architectures adopted by different countries are different. And it is impossible to implement compatible devices produced by different manufacturers, or direct networking thereof on optical lines, which results in technical problems and increased cost.

SDH emerges to overcome the shortcomings of PDH such that it is possible to configure the systems and devices required by future communication networks in a perfect mode. SDH has the major features as follows:

1. SDH unifies the transmission rate of signals of various levels in the hierarchy worldwide. The rate defined by SDH is N×155.520 Mb/s, where Mb/s represents the Megabits transmitted per second, bit is a measurement of information, and N=1, 4, 16, 64 . . . . The most common transmission formats include STM-1, STM-4, STM-16, and STM-64, corresponding to the transmission rate classes of 155 Mb/s, 622 Mb/s, 2.5 Gb/s, and 10 Gb/s, respectively, where Gb/s represents gigabits transmitted per second.

2. SDH simplifies the multiplexing and de-multiplexing technique. SDH is able to directly multiplex a signal with a rate of 2 Mb/s into a signal with a rate of 140 Mb/s, or directly de-multiplex a signal with a rate of 140 Mb/s without class by class de-multiplexing. Thus the multiplexing and de-multiplexing technique is simplified, which makes it easy for signals of various rates to be loaded or unloaded on the lines and improves the flexibility and reliability of the communication network.

3. SDH defines a worldwide universal standard of optical interface such that devices produced by different manufacturers may inter-work with each other according to the unified interface standard, which saves the cost of the network.

4. In the frame format for transmission, more redundant bits are reserved for management and control of the network, which greatly enhances the network capability of detecting failures and monitoring transmission performance.

SDH is often used in optical fibre communications, and in order to save resources of optical fibre and lower costs, SDH is typically used in combination with a Wavelength Division Multiplexing (WDM) system. In another words, multiple single-wavelength optical signals carrying services are combined via a WDM system for transmission on one optical fibre.

As shown in FIG. 1, in a typical WDM system, multiple signals are received via a plurality of Optical Transponder Units (OTU). Each signal is converted into a single-wavelength optical wave by an OTU and are transferred in the format of SDH or other format; the single-wavelength optical wave after conversion enters a wave multiplexer/demultiplexer from each OTU for wave combination, and is transferred via an optical fibre to the wave multiplexer/demultiplexer of the destination node; the wave multiplexer/demultiplexer of the destination node carries out wave separation for the received multi-wavelength optical signal and acquires multiple single-wavelength optical signals; each acquired single-wavelength optical signal is then converted via an OTU into an electrical signal of SDH or other transmission format and is outputted after processing to the device at the client side. Optical Amplifiers (OA) may be configured on the transmission line to amplify the optical signal.

By this method of multiplexing single-wavelength optical signals into one optical fibre for transmission, the WDM system implements the data transmission with large capacity. That is why the WDM technique is frequently adopted in the construction of backbones of wide-area or metropolitan-area networks. In some large metropolises, the transmission range of a metropolitan-area network will be up to 300 kilometers or so. At present, in the WDM backbone of a metropolitan-area network, the transmission rate class of a single-wavelength optical signal is typically 2.5 Gb/s or 10 Gb/s.

In practical applications, however, the commonly adopted transmission rate of single-wavelength optical signal at present, i.e. 2.5 Gb/s or 10 Gb/s rate class is not an optimal choice for the transmission rate of a metropolitan-area network.

Major reasons leading to this situation include: on one hand, although the chromatic dispersion allowance of a 2.5 Mb/s rate-class optical signal is large, the requirement thereof for Optical Signal Noise Ratio (OSNR) is low, and the transmission range thereof is long, there are still the shortcomings of low rate and low use efficiency of wavelength; on the other hand, although the use efficiency of wavelength of the 10 Mb/s rate-class optical signal is high, the chromatic dispersion allowance thereof is too low and the requirement thereof on OSNR is harsh.

For example, when the standard G.652 optical fibre is used, in terms of the 2.5 Gb/s rate-class signal, the requirement of the receiver for OSNR is about 20 dB and the transmission range limited by chromatic dispersion is about 960 kilometers. In terms of the 10 Gb/s rate-class service, the requirement of the receiver for ONSR is about 26 dB and the transmission range limited by dispersion is about 60 kilometers. It is seen thus that the optical communication system transmitting signals in these two rates are not suitable to metropolitan-area network nodes of which the transmission range is less than 300 kilometers.

SUMMARY

The present invention is to provide a method for optical signal transmission, applicable to Metropolitan Area Networks (MAN) and an apparatus for multiplexing/de-multiplexing multiple service signals in an optical communication network so as to multiplex multiple relatively low-rate signals into signals of the rate-class suitable for MAN transmission to satisfy the demand of MAN communications.

Moreover, the present invention is to provide an optical communication system capable of using the existing optical fibre network to meet the demand of MAN communications.

A method of data transmission, comprising: when transmitting data, multiplexing and converting more than one low-rate service signal into an optical signal with a transmission rate of about 5 Gb/s, and transferring the optical signal to a destination node; when receiving data, converting the received optical signal with a transmission rate of about 5 Gb/s into an electrical signal and de-multiplexing the electrical signal to obtain more than one low-rate service signal.

The present invention provides a multiplexing apparatus, including:

a bus converting and interleaving module;
a multiplexing module; and
an optical transmitting module, wherein
the bus converting and interleaving module is used to convert more than one group of parallel electrical signals into one group of parallel electrical signals with a total rate of about 5 Gb/s, and output the electrical signals to the multiplexing module;
the multiplexing module is used to convert the inputted group of parallel electrical signals with a total rate of about 5 Gb/s to a serial electrical signal with a rate of about 5 Gb/s, and output the serial electrical signal with a rate of about 5 Gb/s to the optical transmitting module;
the optical transmitting module is used to convert the serial electrical signal with a rate of about 5 Gb/s from the multiplexing module into an optical signal with the same rate and output the optical signal to a transmission optical fibre.

The present invention provides a de-multiplexing apparatus as well, the apparatus includes:

an Optical Receiving module;
a Clock and Data Recovery+De-multiplexing (CDR+DEMUX) module; and
a bus converting and interleaving module, wherein
the Optical Receiving module is used to convert an externally-inputted optical signal with a rate of about 5 Gb/s into an electrical signal, and output the electrical signal to the CDR+DEMUX module;
the CDR+DEMUX module is used to conduct clock extraction, data recovery, signal de-multiplexing and serial/parallel conversion of the electrical signal from the Optical Receiving module, generate a group of parallel signals with a total rate of about 5 Gb/s, and output the parallel signals to the bus converting and interleaving module;
the bus converting and interleaving module is used to convert the group of parallel signals with a rate of about 5 Gb/s outputted from the CDR+DEMUX module into more than one group of low-rate parallel signals, and output the low-rate signals.

The present invention also provides an optical communication system, comprising optical transmitting units and optical receiving units connected by optical fibres;

the optical transmitting unit comprises at least one sub-rate multiplexing apparatus; the optical receiving unit comprises at least one sub-rate de-multiplexing apparatus;
the sub-rate multiplexing apparatus is used for multiplexing more than one low-rate service optical signal into one optical signals with a rate of about 5 Gb/s;
the sub-rate de-multiplexing apparatus is used for de-multiplexing one optical signal with a rate of about 5 Gb/s into more than one low-rate service optical signal.

The sub-rate multiplexing device includes:
a low-rate signal transmission module;
a bus converting and interleaving module;
a multiplexing module; and
an optical transmitting module; wherein
a low-rate signal transmission module is used to convert more than one inputted low-rate optical signal into low-rate parallel signals, and output the parallel signals to the bus converting and interleaving module;
the bus converting and interleaving module is used to convert the parallel signals outputted from the low-rate signal transmission module into one group of parallel signals with a total rate of about 5 Gb/s, and output the signal to the multiplexing module;
the multiplexing module is used to convert the inputted group of parallel signals with a total rate of about 5 Gb/s into a serial electrical signal with a rate of about 5 Gb/s, and output the serial electrical signal with a rate of about 5 Gb/s to the optical transmitting module;
the optical transmitting module is used to convert the serial electrical signal with a rate of about 5 Gb/s from the multiplexing module into an optical signal of the same rate and output the optical signal to an external optical fibre;

the sub-rate de-multiplexing device comprises:
an optical receiving module;
a Clock and Data Recovery+De-multiplexing (CDR+DEMUX) module;
a bus converting and interleaving module; and
a low-rate signal transmission module, wherein
the optical receiving module is used to convert an externally-inputted optical signal with a rate of about 5 Gb/s into an electrical signal, output the electrical signal to the CDR+DEMUX module;
the CDR+DEMUX module is used to conduct clock extraction, data recovery, signal de-multiplexing and serial/parallel conversion of the electrical signal from the optical receiving module, generat a group of parallel signals with a total rate of about 5 Gb/s, and output the parallel signals to the bus converting and interleaving module;
the bus converting and interleaving module is used to convert a group of parallel signals with a total rate of about 5 Gb/s outputted from the CDR+DEMUX module into more than one low-rate parallel signals, and output the low-rate signals to the low-rate signal transmission module;
the low-rate signal transmission module is used to convert the more than one low-rate parallel signals outputted from the bus converting and interleave module into more than one low-rate optical signals, and output the optical signals.

As can be seen from the above, the following benefits will likely result from the application of the data transmission method, multiplexing/de-multiplexing apparatus and optical communication system in accordance with the present invention:

As the optical communication system in accordance with the present invention transfers single-wavelength signal using the 5 Gb/s rate-class, a plurality of low-rate signals can be multiplexed into signals each with a rate of 5 Gb/s by the multiplexing/de-multiplexing apparatus and the data transmission method in accordance with the present invention. Since the OSNR requirement of a signal with a rate of 5 Gb/s is about 23 dB while the dispersion-limited range is relatively long, i.e. about 240 kilometers, which can cover the entire MAN, thus, the solution in accordance with the present invention, solves the problem of low use efficiency of wavelength caused when 2.5 Gb/s optical signals are used, and doubles the original use rate of wavelength while the cost does not increase sharply; on the other hand, the 240-kilometer dispersion-limited range can basically meet the range demand of a MAN which solves the problem of smaller range coverage caused when 10 Gb/s optical signals are used.

DETAILED DESCRIPTION OF THE EMBODIMENTS

Figure 1:
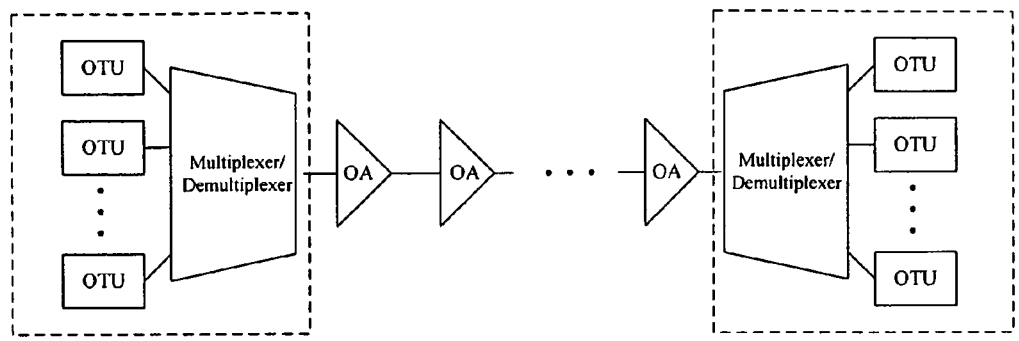
FIG. 1 is a schematic view illustrating the structure of a typical WDM system.

A further detailed description is hereinafter given to the present invention with reference to embodiments and accompanying drawings so as to make the objectives, technical solution and merits of the present invention more apparent.

In accordance with the present invention, an optical communication system with a single-wavelength transmission rate of 5 Gb/s is most suitable for constructing a MAN. In order to implement an optical communication system with a single-wavelength transmission rate of 5 Gb/s, the present invention puts forward a multiplexing method which multiplexes multiple low-rate signals into one signal with a rate of 5 Gb/s, as well as a de-multiplexing method which de-multiplexes one signal with the rate of 5 Gb/s into multiple low-rate signals. The low-rate signals mentioned herein may include SDH signals with a rate of 2.5 Gb/s or below, Ethernet signals, enterprise system connection signals, fibre connection signals, fibre channel signals and etc.

It should be noted that, in accordance with the method of the present invention, the above single-wavelength with a transmission rate of 5 Gb/s can be implemented in multiple ways. In a preferred embodiment of the present invention, four Gigabit Ethernet (GE) signals are multiplexed into one signal with a rate of 5 Gb/s; in another preferred embodiment, two 2.5 Gb/s SDH signals are multiplexed into one 5 Gb/s signal, with the accurate rate of 2.48832 Gbps×2=4.97664 Gb/s; and in still another preferred embodiment of the present invention, when two 2.5 Gb/s SDH signals are multiplexed into one signal with a rate of 5 Gb/s, Forward Error Correction (FEC) coding according to RS (255, 239) is incorporated with the accurate transmission rate of 5.332114 Gb/s. Thus, the 5 Gb/s described here covers a range of rates around 5 Gb/s rather than refers to the exact 5 Gb/s transmission rate. When services are transferred in a G.652 optical fibre with a rate of 5 Gb/s, the OSNR requirement for the transferred signal is about 23 dB and the dispersion-limited range is about 240 kilometers, which can very well meet the requirement of a MAN on rate and scale.

A detailed description of the data transmission method in accordance with the present invention will be given hereinafter.

In a preferred embodiment of the present invention, the data transmission method in accordance with the present invention includes:

when transmitting data, multiplex and convert more than one low-rate service signal into an optical signal with a transmission rate of 5 Gb/s, and transfer the optical signal to a destination node;

when receiving data, convert the received optical signal with a transmission rate of 5 Gb/s into an electrical signal, and de-multiplex the signal to obtain more than one low-rate service signal.

In the above preferred embodiment, the low-rate service signals may include four GE signals or two SDH signals with a rate of 2.5 Gb/s. By means of the above method, four GE signals or two SDH signals with a rate of 2.5 Gb/s can be directly multiplexed into one signal with a rate of 5 Gb/s.

In addition, the multiplexing operation in the above step may be conducted using bit interleaved multiplexing, two-bit interleaved multiplexing, or byte interleaved multiplexing. It should be noted that the present embodiment does not limit the mode of interleaved multiplexing.

In another preferred embodiment of the present invention, two GE signals are first converged into one SDH signal with a rate of 2.5 Gb/s, which are then multiplexed into one 5 Gb/s signal.

The method in accordance with this embodiment, when transmitting data, includes the steps of:

A. convert more than one low-rate service signal into more than one low-rate SDH frame;

B. multiplex the obtained more than one low-rate SDH frame into a signal with a rate of 5 Gb/s;

When receiving signals, the method of this embodiment includes the steps of:

a. de-multiplex the 5 Gb/s signal into more than one low-rate SDH frame;

b. inversely-convert the obtained low-rate SDH frames into more than one low-rate service signal.

The converting operation in the above Step A includes: encapsulating, mapping, and framing operations; while the inversely-conversion in the above Step b includes: frame-searching, de-mapping, and de-encapsulating operations.

The encapsulating and de-encapsulating operations may be conducted using the HDLC protocol; the mapping and de-mapping operations uses VC4-8C or VC4-8V; and the framing and frame-searching operations may use the standard SDH processing method defined by ITU-T. It is known to those skilled in the art that the encapsulating and de-encapsulating operations may also be conducted in such modes as defined in the GFP protocol or LAPS protocol.

And the multiplexing/de-multiplexing operations in the above steps may be conducted in such modes as bit interleaved, two-bit interleaved, or byte interleaved multiplexing/de-multiplexing.

In addition, in the data transmission process of the above two embodiments, in order to make the receiving end of the low-rate signals receive appropriate low-rate service signals in the process of de-multiplexing the received signals, before the above multiplexing process, different identifiers need to be configured for each transmitting end and receiving end, respectively, which is used for indicating the corresponding relationship of each transmitting end and receiving end. Furthermore, when a transmitting end transmits the above low-rate service signals, it needs to add the identifier of the transmitting end to each of the low-rate service signals such that the receiving end could determine whether the received signals are transmitted by the corresponding transmitting end.

For example, in the process of multiplexing two STM-16 signals each with a transmission rate of 2.5 Gb/s into one signal with a rate of 5 Gb/s, write in the J0 bytes of the two low-rate STM-16 signals the hexadecimal numbers of AF and F5, respectively, wherein AF represents the first STM-16 signal and F5 represents the second STM-16 signal. In this way, it is possible to match the low-rate signals with the receiving end of low-rate signals by detecting the contents of byte J0 while receiving. It can be understood by those skilled in the art of the present invention that the contents of byte J0 may be any two constants predefined, which do not go beyond the essence and scope of the present invention.

The above matching process primarily includes:

a1. determine according to the contents of byte J0 set by the transmitting end whether the corresponding relationship between the de-multiplexed low-rate service signals and the receiving end is correct, if correct, terminate this process; otherwise, proceed to Step a2;

a2. switch the order of the de-multiplexed low-rate service signals, and then terminate this process.

The above transmission method of multiple service signals in accordance with the present invention further includes: conducting FEC coding for the transmitted signal with a rate of 5 Gb/s when transmitting signals; and conducting FEC decoding for the received signal with a rate of 5 Gb/s when receiving signals. In this way, error codes generated in optical fibre transmission can be further reduced and the transmission range can be increased.

In order to multiplex low-rate signals into a high-rate signal according to the above embodiments, a sub-rate multiplexing/de-multiplexing apparatus is provided. The sub-rate herein refers to the lower-rate signal flow to be converged into a higher-rate signal flow.

Figure 2:
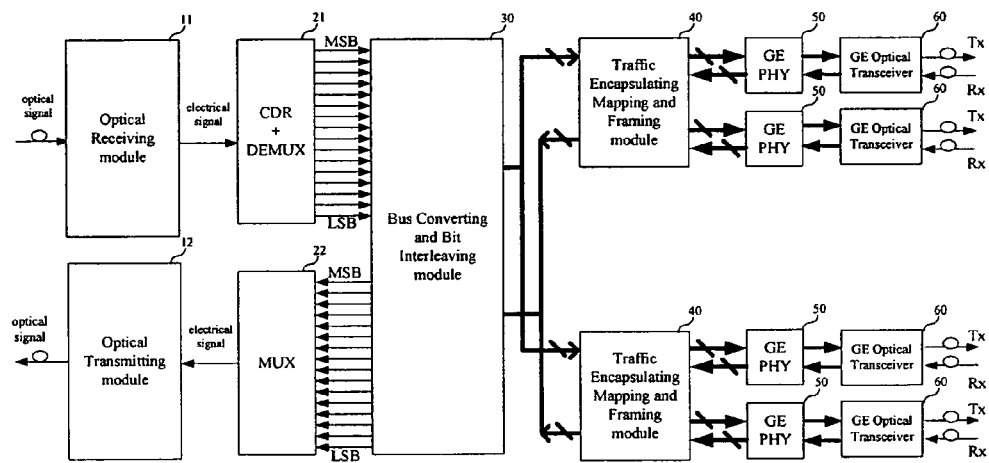
FIG. 2 is a diagram illustrating the structure of a sub-rate multiplexing/de-multiplexing device adopting bit interleaving in accordance with one preferred embodiment of the present invention.

FIG. 2 is a diagram illustrating the structure of a sub-rate multiplexing/de-multiplexing apparatus using bit interleaving in accordance with one preferred embodiment of the present invention. The sub-rate multiplexing/de-multiplexing apparatus in this embodiment multiplexes four GE signals into one signal with a rate of 5 Gb/s. As shown in FIG. 2, the sub-rate multiplexing/de-multiplexing apparatus includes an Optical Receiving module 11, an Optical Transmitting module 12, a CDR+DEMUX (Clock and Data Recovery+De-multiplexing) module 21, a MUX (Multiplexer) module 22, a Bus Converting and Bit Interleaving module 30, two Traffic Encapsulating Mapping and Framing modules 40, four GE PHYs (GE Physical Layer Interface modules) 50, and four GE Optical Transceivers 60.

Wherein, the Optical Receiving module 11 is used for receiving a 5 Gb/s optical signal transferred from a fibre line, converting the optical signal into a 5 Gb/s serial electrical signal, amplifying and outputting the signal to the CDR+DEMUX module 21.

The Optical Transmitting module 12 is used for converting the serial electrical signal with a rate of 5 Gb/s received from the MUX module 22 into an optical signal of the same rate via electrical/optical conversion, and outputting the converted signal to a fibre line for transmission. If this apparatus is used in WDM, the optical wavelength of the Optical Transmitting module 12 should also conform to the wavelength recommended by ITU-T, e.g. wavelengths recommended in G.694.1 or G.694.2.

The CDR+DEMUS module 21 is used for receiving the serial electrical signal with a rate of 5 Gb/s outputted from the Optical Receiving module 11, i.e. first the CDR sub-module implements clock extraction and data recovery for the signal, and then the DEMUX sub-module de-multiplexes the signal, conducts serial/parallel conversion, and then outputs 16 parallel signals each with a rate of 311 Mb/s to the Bus Converting and Bit Interleaving module 30.

The MUX module 22 is used for receiving the 16 parallel signals each with a rate of 311 Mb/s outputted from the Bus Converting and Bit Interleaving module 30, conducting parallel/serial conversion, multiplexing the signals into a serial electrical signal with a rate of 5 Gb/s, and then outputting the electrical signal to the Optical Transmitting module 12.

The Bus Converting and Bit Interleaving module 30 is used for converting one group of 16 parallel signals each with a rate of 311 Mb/s inputted from the CDR+DEMUX module 21 in the receiving direction into two STM-16 signals each including a group of parallel signals; meanwhile in the transmitting direction, this module converts two STM-16 signals each including a group of parallel signals into one group of 16 parallel signals each with a rate of 311 Mb/s. The two STM-16 signals outputted from the Bus Converting and Bit Interleaving module 30 are inputted to two identical Traffic Encapsulating Mapping and Framing modules 40, respectively, and meanwhile the module 30 receives two parallel STM-16 signals outputted from two Traffic Encapsulating Mapping and Framing modules 40. The Bus Converting and Bit Interleaving module 30 may be implemented by such means as Field Programmable Gate Array (FPGA).

The Traffic Encapsulating Mapping and Framing module 40 is used for receiving one STM-16 signal outputted from the Bus Converting and Bit Interleaving module 30 in the receiving direction, implementing the frame-searching, de-mapping, and de-encapsulating functions, and outputting two GE physical-layer signals each with a rate of 1.25 Gb/s to two GE PHY 50; meanwhile, receiving in the transmitting direction two GE physical-layer signals each with a rate of 1.25 Gb/s outputted from two GE PHY 50, mapping and framing signals using an STM-16 frame format, implementing the encapsulating, mapping and framing functions, respectively, and outputting one STM-16 signal. The interface between the Traffic Encapsulating Mapping and Framing module 40 and the GE PHY 50 includes a Gigabit Media Independent Interface (GMII) conforming to IEEE 802.3 standard, thus each GE physical-layer signal outputted by the Traffic Encapsulating Mapping and Framing module 40 is a GMII physical-layer electrical signal with a width of 8-bit. Frame-searching in the receiving direction is implemented by means of the SDH standard processing method defined by ITU-T, de-mapping is implemented by means of VC4-8C or VC4-8V, and de-encapsulating is implemented by means of HDLC, GFP, or LAPS protocol. Encapsulating in the transmitting direction is implemented by means of the HDLC, GFP, or LAPS protocol, mapping is by means of VC4-8C or VC4-8V, and framing is implemented by the SDH standard processing method defined by ITU-T. For example, in a preferred embodiment of the present invention, GE traffic is encapsulated in an HDLC mode, which ensures complete, transparent, and damage-free transmission of the traffic. Meanwhile, the Traffic Encapsulating Mapping and Framing module 40 implements a monitoring function on signal quality, e.g. it can detect Loss of Frame (LOF) of the signal and the J0 byte of the SDH signal.

The GE PHY 50 is used for receiving in the receiving direction one GMII physical-layer electrical signal with a width of 8-bit data outputted from the Traffic Encapsulating Mapping and Framing module 40, and outputting a serial bit-stream GE signal with a rate of 1.25 Gb/s. Besides, the GE PHY 50 is also used for receiving in the transmitting direction a serial bit-stream GE signal with a rate of 1.25 Gb/s outputted from the GE Optical Transceiver 60, and after processing, outputting a GMII physical-layer electrical signal of an 8-bit data width. The GE PHY 50 is also used for implementing a monitoring function of the quality of GE signals, e.g. monitoring the result of Cyclic Redundancy Check (CRC) of signals.

The GE Optical Transceiver 60 includes a GE optical transmitting module and a GE optical receiving module. Wherein, the GE optical transmitting module is used for receiving a service serial bit-stream GE signal with a rate of 1.25 Gb/s and converting the electrical signal into an optical signal, and meanwhile the GE optical receiving module receives an externally-inputted optical GE service signal with a rate of 1.25 Gb/s, converts the optical signal into an electrical signal, and outputs the converted signal to the GE PHY 50.

Herein, one Traffic Encapsulating Mapping and Framing module 40, two GE PHY 50 and two GE Optical Transceivers 60 that are interconnected on a branch of FIG. 2 may be seen as one 2.5 Gb/s data transmission transceiving module.

The foregoing describes the functions of each module of the sub-rate multiplexing/de-multiplexing apparatus in preferred embodiments of the present invention. A further detailed description is hereinafter given to the specific implementation of the function of the Bus Converting and Bit Interleaving module 30.

In the above preferred embodiments, the Bus Converting and Bit Interleaving module 30 implements the interleaved multiplexing of two groups of signals in a bit interleaving mode. In the transmitting direction, the Bus Converting and Bit Interleaving module 30 converges two STM-16 signals each with a rate of 2.5 Gb/s into a group of signals with a total rate of 5 Gb/s for transmission on the line, and the bit interleaving method specifically includes: making one 2.5 Gb/s signal as an odd-bit signal of a 5 Gb/s signal and making the other the 2.5 Gb/s signal as an even-bit signal of the 5 Gb/s signal. In the receiving direction, the Bus Converting and Bit Interleaving module 30 separates the odd bits and the even bits of a 5 Gb/s signal to obtain two STM-16 signals each with a rate of 2.5 Gb/s. It can be understood by those skilled in the art of the present invention that such interleaving mode as a 2-bit interleaving may also be used in the Bus Converting and Bit Interleaving module 30 without departing from the essence and scope of the present invention.

Figure 3:
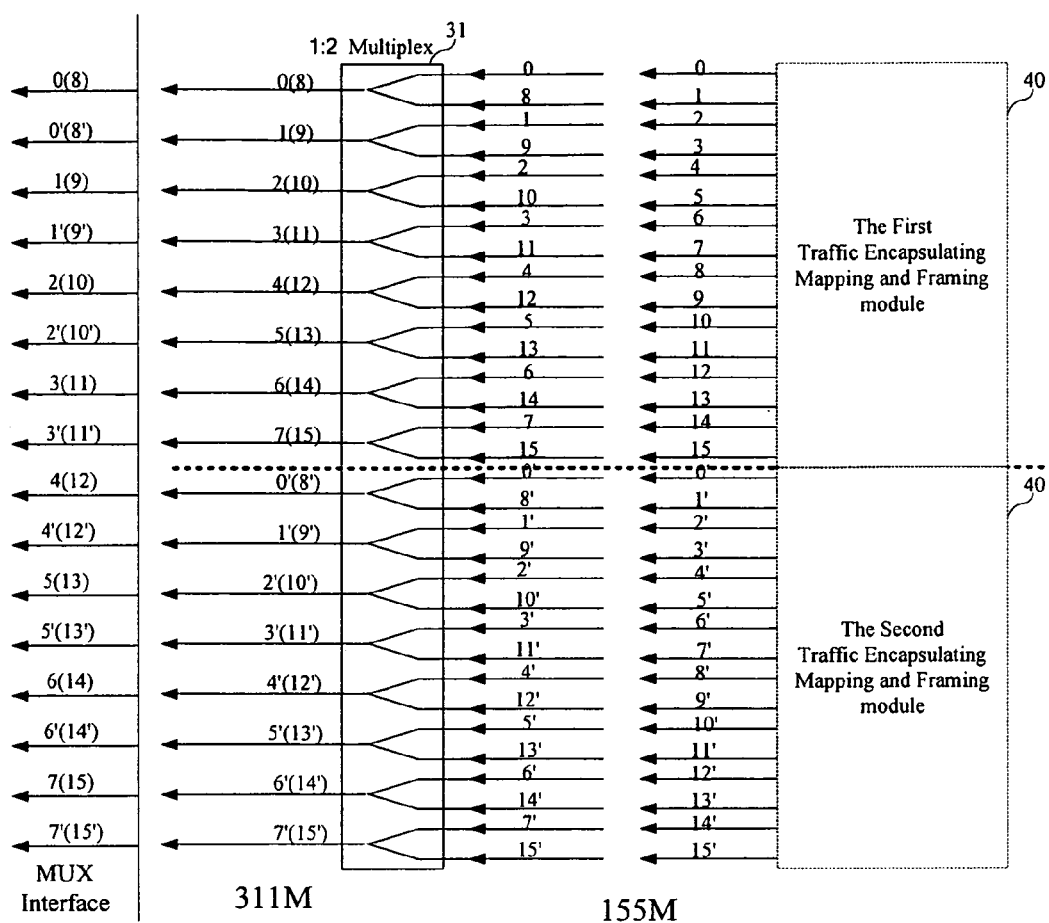
FIG. 3 is a schematic view illustrating the transmitting principle of a Bus Converting and Bit Interleaving module in accordance with a preferred embodiment of the present invention.

FIG. 3 is a schematic view illustrating the transmitting principle of the Bus Converting and Bit Interleaving module in accordance with the above preferred embodiments of the present invention. As shown in FIG. 3, two parallel STM-16 signals outputted from two Traffic Encapsulating Mapping and Framing modules 40 are composed of two groups of 16 parallel signals each with a rate of 155 Mb/s, respectively, and are denoted as 0, 1, 2, . . . , 15 and 0', 1', 2', . . . , 15', respectively, i.e. 32 signals in all. Since the MUX module 22 requires that each STM-16 signal be composed of 8 parallel signals each with a rate of 311 Mb/s, every two 155 Mb/s signals in one group of parallel signals have to be multiplexed via one 1:2 MUX 31 to obtain one 311 Mb/s signal before being inputted to the MUX module 22. Meanwhile, in order to guarantee the transmission sequence of the signals, the two input-bits of each 1:2 MUX 31 should be staggered by a length of one byte, i.e. 8 bits, for example, the first MUX connects 155 Mb/s signal 0 of Path 0 with 155 Mb/s signal 8 of Path 8 which are both outputted from the first Traffic Encapsulating Mapping and Framing module 40 to multiplex and output one 311 Mb/s signal, which is denoted as 0(8); the second MUX connects 155 Mb/s signal 1 of Path 1 of the first Traffic Encapsulating Mapping and Framing module with 155 Mb/s signal 9 of Path 9 thereof to output one 311 Mb/s signal denoted as 1(9), and the rest may be inferred. In this way, two groups of parallel signals denoted in order, respectively, as 0(8), 1(9), 2(10) . . . , 7(15) and 0'(8'), 1'(9'), 2'(10') . . . , 7'(15') are obtained, and each group of the parallel signals includes 8 parallel signals each with a rate of 311 Mb/s.

In order to implement bit interleaving of two STM-16 signals, after 1:2 multiplexing, the first STM-16 signal is connected to odd bits of the input bus of the MUX module 22 while the second STM-16 signal to even bits thereof to obtain one signal with a rate of 5 Gb/s. In this way, as shown in FIG. 3, there will be 16 parallel signals each with a rate of 311 Mb/s denoted in order, respectively, as 0(8), 1(9), 2(10) . . . , 7(15) and 0'(8'), 1'(9'), 2'(10') . . . , 7'(15') on the input bus of the MUX module 22.

Figure 4:
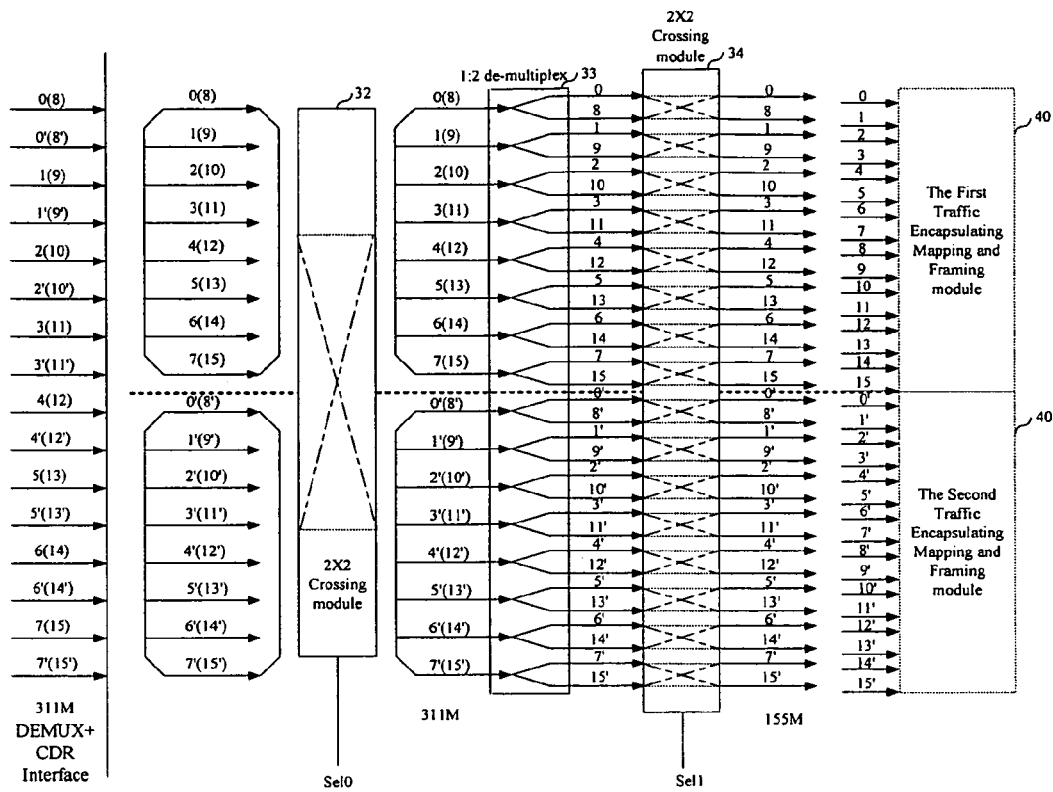
FIG. 4 is a schematic view illustrating the receiving principle of a Bus Converting and Bit Interleaving module in accordance with a preferred embodiment of the present invention.

FIG. 4 is a schematic view illustrating the receiving principle of a Bus Converting and Bit Interleaving module in accordance with the above preferred embodiments of the present invention. As shown in FIG. 4, the 16 parallel signals each with a rate of 311 Mb/s on the input bus of the MUX module 22 are denoted as 0(8), 0'(8'), 1(9), 1'(9'), 2(10), 2'(10') . . . , 7(15) and 7'(15'), and the Bus Converting and Bit Interleaving module 30 and the CDR+DEMUX module 21 are connected in an interleaving way, therefore, in the receiving direction, the Bus Converting and Bit Interleaving module 30 separates the 16 parallel signals each with a rate of 311 Mb/s outputted from the CDR+DEMUX module 21 into two groups, i.e. one group of "0(8), 1(9), 2(10) . . . , 7(15)" and the other group of "0'(8'), 1'(9'), 2(10') . . . , 7'(15')", which are hereinafter referred to as Group A and Group B, respectively. According to the above description, data of Group A and Group B correspond to one of the two parallel STM-16 signals, respectively, while the specific corresponding relation is uncertain. Therefore, the Bus Converting and Bit Interleaving module 30 should include a 2×2 crossing module 32 such that 2×2 crossing operation could be conducted to switch the position of the two parallel STM-16 signals when there is an error in the above corresponding relation.

In the preferred embodiments of the present invention, the contents of byte J0 of a STM-16 are used as an identifier to determine the corresponding relationship between signals of Group A and Group B and the first STM-16 signal and the second STM-16 signal. For example, the hexadecimal contents of AF and F5 may be written in bytes J0 of the first and the second STM-16 signals via the Traffic Encapsulating Mapping and Framing module 40 at the transmitting end, respectively, and determination can be made via the Traffic Encapsulating Mapping and Framing module 40 at the receiving end whether the content of byte J0 of the received signal, i.e. AF or F5, matches the identifier of the receiving end so as to receive the frames correctly, if it matches the identifier, receive the signal directly; if it does not match the identifier, control the 2×2 crossing module 32 by setting a control signal Sel0 of the 2×2 crossing module 32 to switch the two groups of signals. For example, if byte J0 of a received signal includes AF, the signal is the first STM-16 signal; if the content of byte J0 is F5, the signal is the second STM-16 signal. The first Traffic Encapsulating Mapping and Framing module 40 will detect whether byte J0 of the received signal is AF while the second Traffic Encapsulating Mapping and Framing module 40 will detect whether byte J0 of the received signal is F5, if not, conduct 2×2 crossing operation.

Since the Traffic Encapsulating Mapping and Framing module 40 uses a data line with a width of 16-bit, it is then needed in the receiving process to convert a group of 8 parallel signals each with a rate of 311 Mb/s into a group of 16 parallel signals each with a rate of 155 Mb/s. Therefore, the Bus Converting and Bit Interleaving module 30 should also include a 1:2 DEMUX module 33, for 1:2 de-multiplexing each of the 8 signals, i.e. de-multiplexing each of the 311 Mb/s signals into two parallel 155 Mb/s signals. As a result of 1:2 de-multiplexing, there may be a wrong connection of the signals, which may further make the Traffic Encapsulating Mapping and Framing module 40 unable to find the frame head of a STM-16 signal and cause a LOF alarm. Therefore, the Bus Converting and Bit Interleaving module 30 should also include a 16-input 2×2 crossing module 34 such that a control signal Sel1 of the 16-input 2×2 crossing module 34 could be set to control the 16-input 2×2 crossing module 34 to switch the 32 input signals when there is an LOF alarm.

Figure 5:
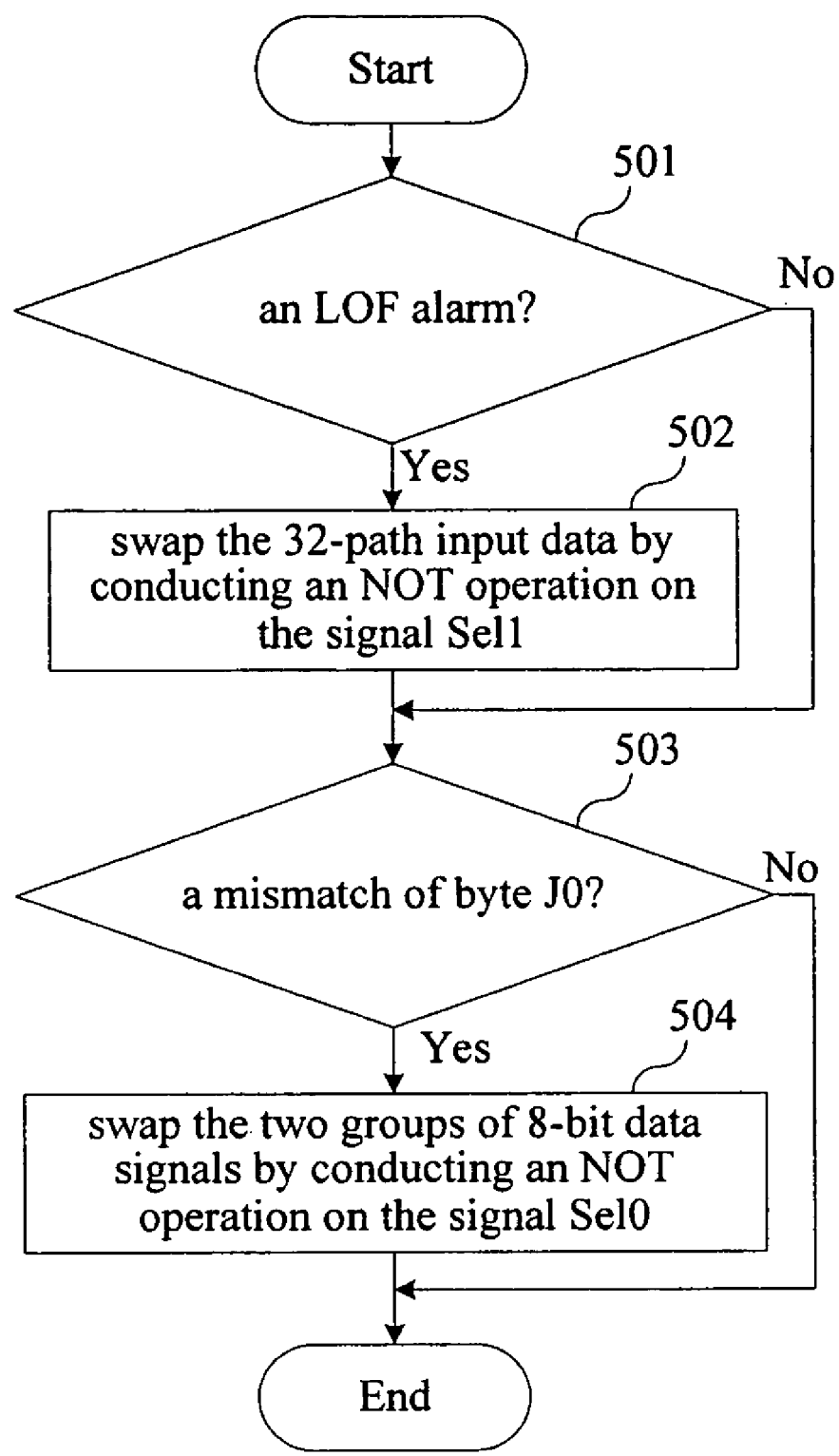
FIG. 5 is a flowchart illustrating signal adjustment and control according to an embodiment of the present invention.

As can be seen from the above description, proper adjustment of signal is needed in order to guarantee the correctness of the signals entering two Traffic Encapsulating Mapping and Framing modules, of which the control flowchart is as shown in FIG. 5, comprising the steps of:

Step 501: decide whether there is an LOF alarm, if yes, proceed to Step 502; otherwise proceed to Step 503;

Step 502: conduct an NOT operation on the signal Sel1 to control the 16-input 2×2 crossing module to switch the 32 input signals;

Step 503: decide whether there is a mismatch of byte J0, if yes, proceed to Step 504; otherwise terminate this process;

Step 504: conduct an NOT operation on the signal Sel0 to control the 2×2 crossing module to switch the two groups of 8-bit data signals;

It should be noted that it is possible that an LOF or a byte J0 mismatch alarm is caused by other reasons, such as the degradation of signal quality in the transmission on fibre lines. In that case, it is impossible to remove the alarms of these two types by conducting switching operations via the control of control signals of Sel1 and Sel0. Then, a decision may be made by software, i.e. when an alarm can not be removed after several switching operation, it proves that the alarm is caused by other reasons.

The foregoing is a description of combining multi low-rate signals into one high-rate signal using a bit interleaving mode. It can be understood by those skilled in the art of the present invention that the same goal may be achieved using a byte interleaving mode.

Figure 6:
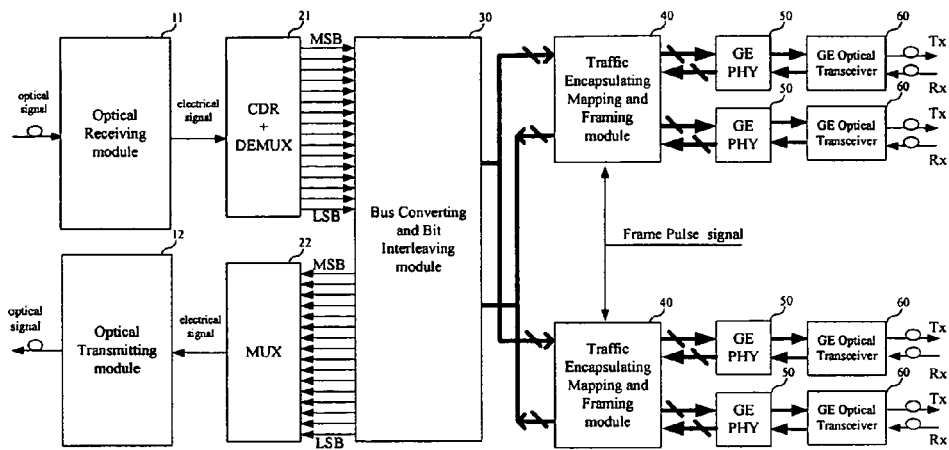
FIG. 6 is a diagram illustrating the structure of a sub-rate multiplexing/de-multiplexing device adopting byte interleaving in accordance with another preferred embodiment of the present invention.
Figure 7:
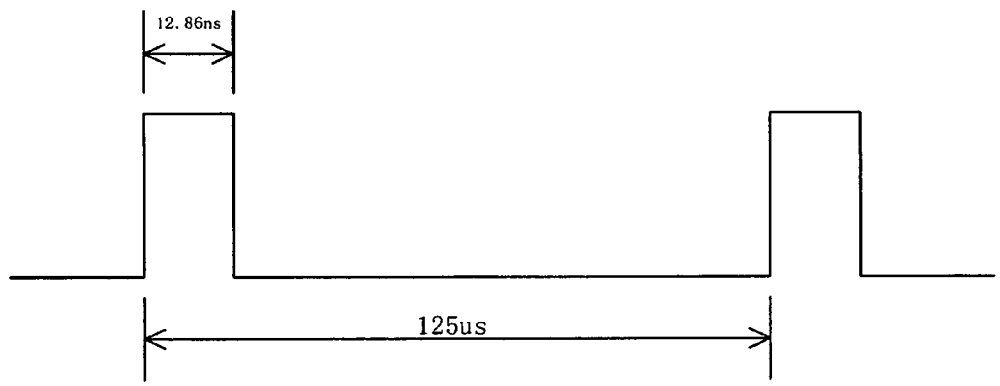
FIG. 7 is a schematic view illustrating the frame pulse signal in accordance with the present invention.

FIG. 6 is a diagram illustrating the structure of a sub-rate multiplexing/de-multiplexing apparatus of a byte interleaving mode in accordance with the present invention. As shown in FIG. 6, in the transmitting direction, compared with bit interleaving, a Frame Pulse (FP) signal is added in the byte interleaving mode, for controlling the Traffic Encapsulating Mapping and Framing module 40 such that two Traffic Encapsulating Mapping and Framing modules 40 could implement frame alignment when transmitting parallel STM-16 signals. An FP signal is a group of pulse signals with a repetition frequency of 8K, and a pulse width of 12.86 ns (to be exact, 1/77.76 ms), of which the schematic is as shown in FIG. 7. It should be noted that the repetition frequency of an FP signal is usually 8K while the width of FP occupies one clock period of overhead, which is determined by different timing of overhead processing and may be different values. Furthermore, a Bus Converting and Byte Interleaving module 30' substitutes the Bus Converting and Bit Interleaving module 30 to implement the byte interleaving operation of two parallel STM-16 signals.

Figure 8:
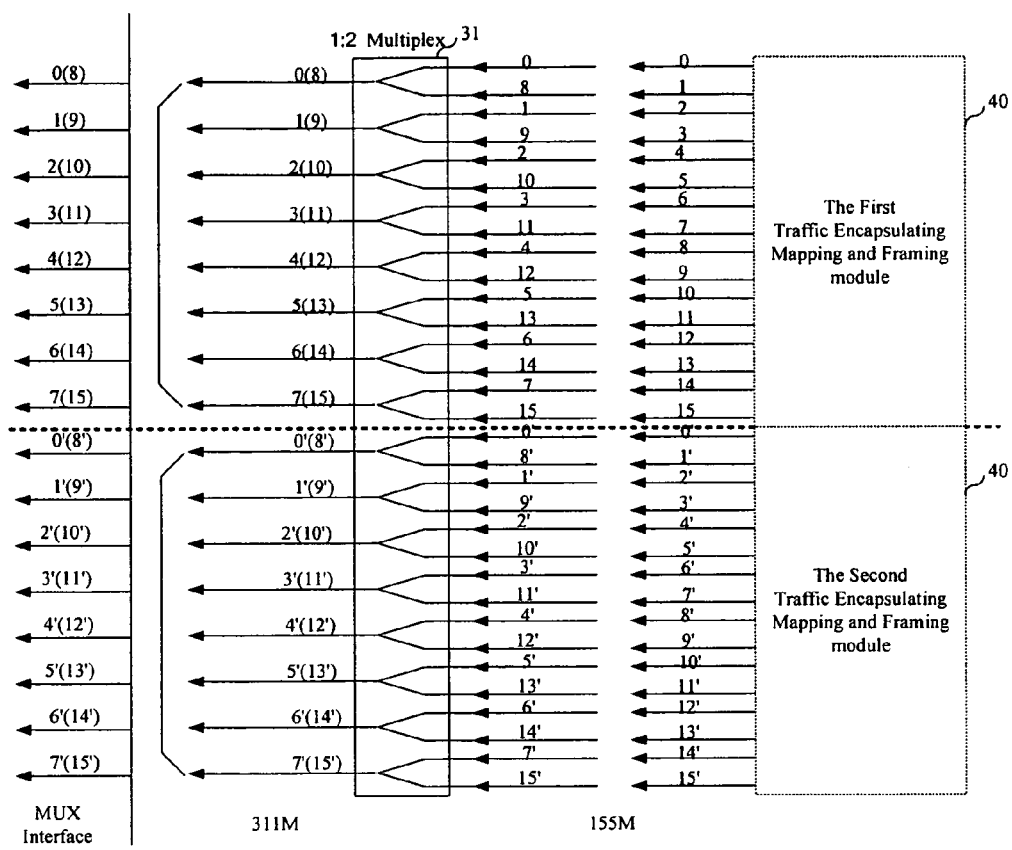
FIG. 8 is a schematic view illustrating the transmitting principle of a bus converting and byte interleaving module in accordance with a preferred embodiment of the present invention.

FIG. 8 is a schematic view illustrating the transmitting principle of the Bus Converting and Byte Interleaving module in the above preferred embodiment. As shown in FIG. 8, in this preferred embodiment, the 1:2 multiplexing method is the same as displayed in FIG. 3. As the byte interleaving method is used, however, the first signal after 1:2 multiplexing are connected successively with Bit 0-7 of the input bus of MUX module 22, and the second signal after 1:2 multiplexing are connected successively with Bit 8-15 of the input bus of MUX module 22, thereby implementing the byte interleaving operation. Then, the parallel signals on the input bus of MUX module 22 are successively denoted as 0(8), 1(9), 2(10) . . . , 7(15), 0'(8'), 1'(9'), 2'(10') . . . , 7'(15').

Figure 9:
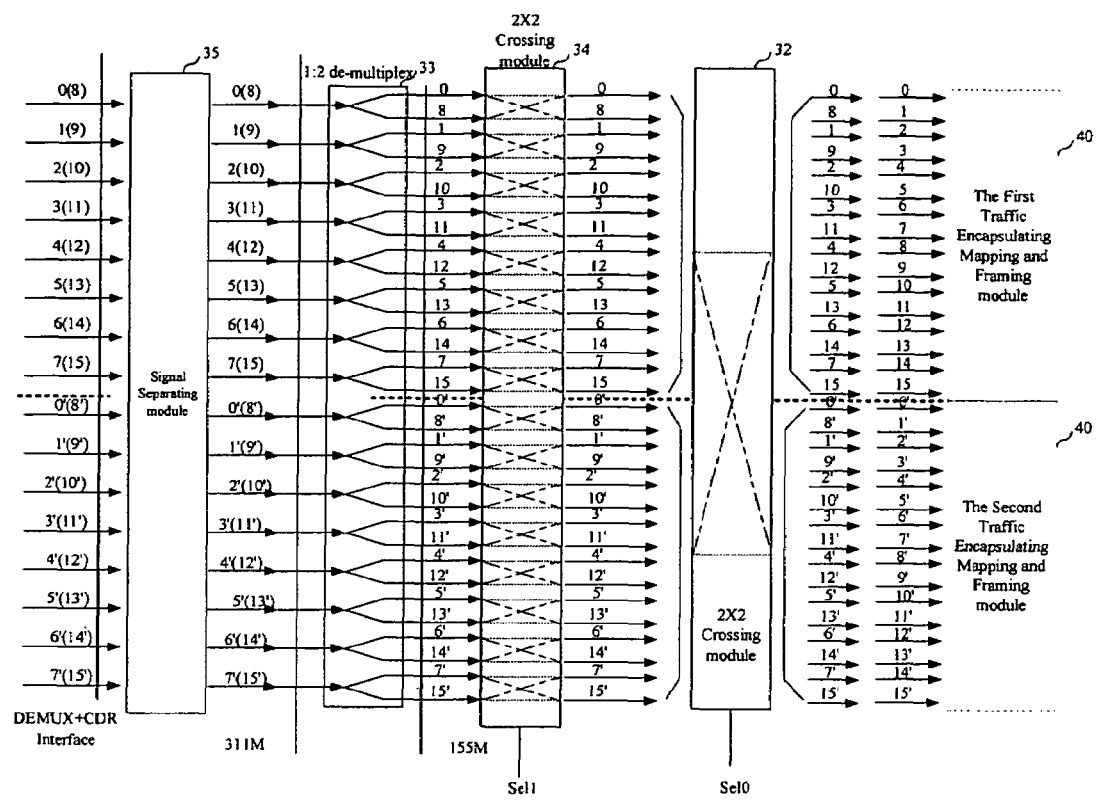
FIG. 9 is a schematic view illustrating the receiving principle of a bus converting and byte interleaving module in accordance with a preferred embodiment of the present invention.

FIG. 9 is a schematic view illustrating the receiving principle of the Bus Converting and Byte Interleaving module in the above preferred embodiment. With reference to FIG. 4, the Bus Converting and Byte Interleaving 30' shown in FIG. 9 is the same as the Bus Converting and Bit Interleaving 30 shown in FIG. 4, and includes a 2×2 crossing module 32, a 1:2 DEMUX 33, and a 16-input 2×2 crossing module 34.

The Bus Converting and Byte Interleaving 30' also guarantees the correctness of the signals outputted to two 2.5 Gb/s data transmission modules by making a decision based on byte J0, i.e. the signal received by the first Traffic Encapsulating Mapping and Framing module are the signal belonging to the first Traffic Encapsulating Mapping and Framing module 40 rather than the second Traffic Encapsulating Mapping and Framing module 40. When byte J0 does not match the identifier, the control signal of Sel0 is set to control the 2×2 crossing module 32 to conduct a switching operation.

Likewise, after a 1:2 de-multiplexing, there may be the situation of wrongly-connected signals, making the Traffic Encapsulating Mapping and Framing module 40 unable to find the frame head of a STM-16 signal and thus cause an LOF alarm. Therefore, when module 30' is used, the correctness of de-multiplexing operation can be guaranteed by making a decision based on an LOF alarm, which is similar to using module 30, i.e. when there is an LOF alarm, set the control signal of Sel1 of the 16-input 2×2 crossing module 34 to control module 34 to switch the 32 input signals.

In addition, in order to prevent byte-crossing in the two signals, a Signal Separating module 35 is added to the Bus Converting and Byte Interleaving module 30'. Module 35 separates the first service signal from the second service signal by searching the frame aligning byte of each signal and ensures that the outputted lower 8-bit signal thereof is one STM-16 signal, and the higher 8-bit signal thereof is the other STM-16 signal. The working principle here is: as there are frame aligning bytes in each frame of the STM-16 signal, i.e. A1 and A2 which are the hexadecimal values of F6 and 28, respectively, and since the two signals are aligned frame by frame when being transmitted, two independent signals can be recognized and separated as long as the two adjacent bytes of F628 are found.

It should be noted that the above described Bus Converting and Bit Interleaving module 30 and the Bus Converting and Byte Interleaving module 30' are two specific examples of implementing a bus converting and interleaving module, wherein the difference is that the former is implemented in a bit interleaving mode while the latter in a byte interleaving mode.

In the above embodiment, as parallel STM-16 signals outputted from the Traffic Encapsulating Mapping and Framing module 40 are 16 signals each with a rate of 155 Mb/s, which do not match the input rate of 311 Mb/s required by the MUX module 22 and the DEMUX+CDR module 21, bus converting and interleaving modules 30 and 30' should include a 1:2 MUX and a 1:2 DEMUX to conduct the conversion between the rates of 155 Mb/s and 311 Mb/s.

In another preferred embodiment of the present invention, Encapsulating Mapping and Framing module 40' substitutes Encapsulating Mapping and Framing module 40, wherein the output and input of module 40' are both 8 parallel signals each with a rate of 311 Mb/s, then the design of bus converting and interleaving modules 30 and 30' can be greatly simplified.

Figure 10:
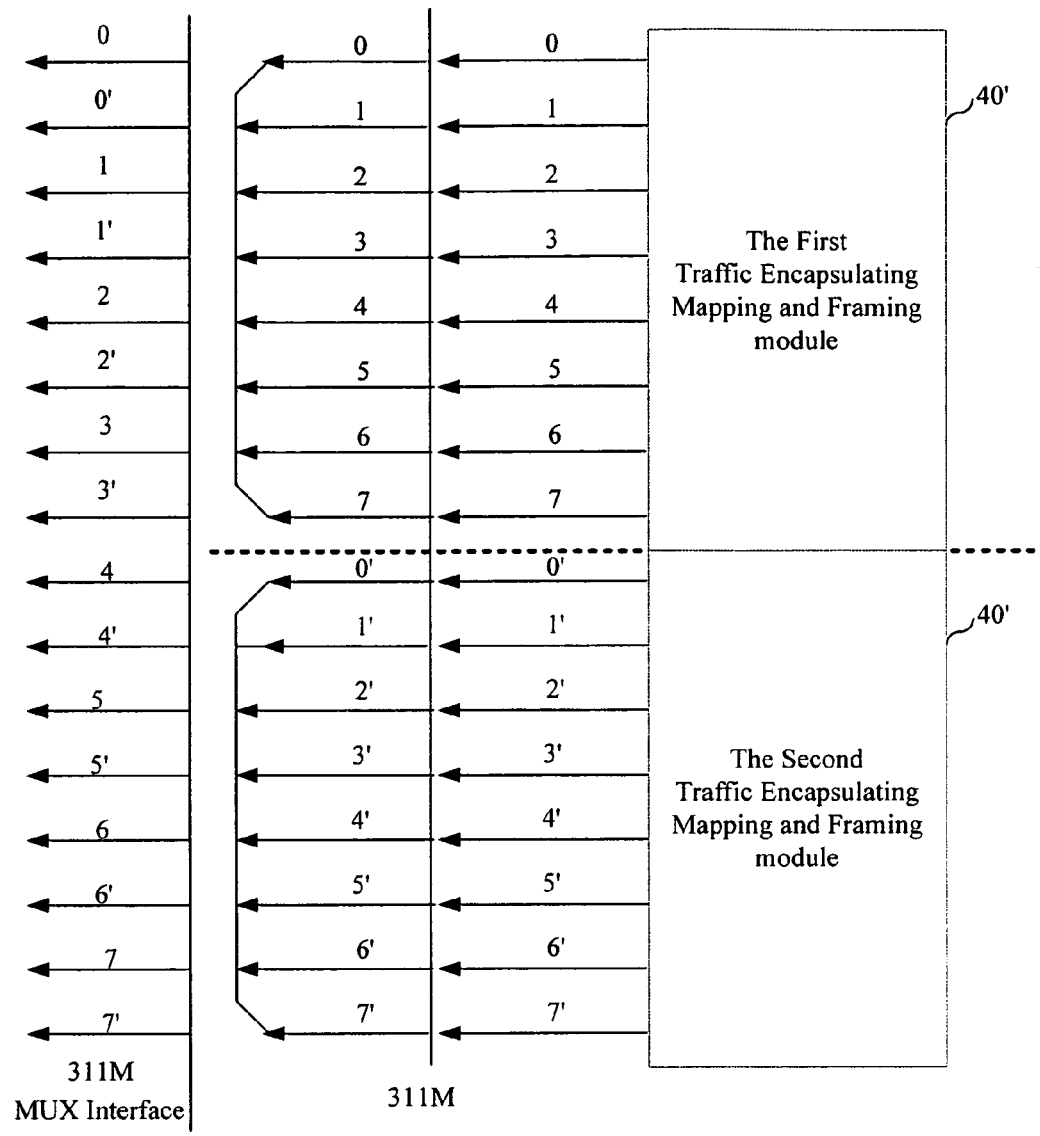
FIG. 10 is a schematic view illustrating the transmitting principle of a Bus Converting and Bit Interleaving module in accordance with another preferred embodiment of the present invention.

FIG. 10 is a schematic view illustrating the transmitting principle of the Bus Converting and Bit Interleaving module in the above preferred embodiment of the present invention. As shown in FIG. 10, the first Traffic Encapsulating Mapping and Framing module 40' and second Traffic Encapsulating Mapping and Framing module 40' output a group of 8 parallel signals each with a rate of 311 Mb/s, respectively, which are denoted as 0-7 and 0'-7', respectively. As the output of module 40' matches the input rate of the MUX module 22, the bit interleaving operation can be implemented by just inputting the outputted bits alternately and successively from the first and the second Traffic Encapsulating Mapping and Framing modules, i.e. the denoting labels of the input signals on the input bus of the MUX module 22 are successively as 0, 0', 1, 1', 2, 2', 3, 3', 4, 4', 5, 5', 6, 6', 7, 7'. In this embodiment, the Bus Converting and Bit Interleaving module 30 in the transmitting direction has actually only the function of a connecting line.

Figure 11:
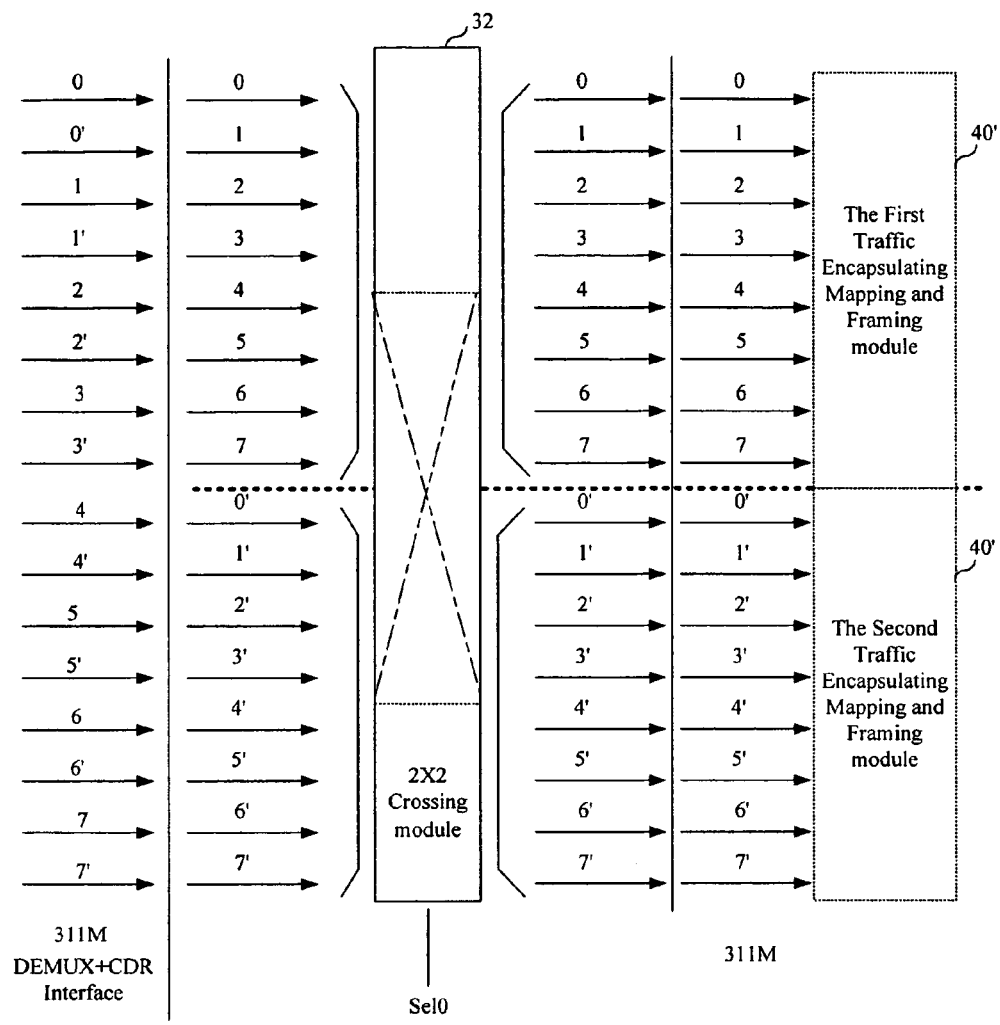
FIG. 11 is a schematic view illustrating the receiving principle of a Bus Converting and Bit Interleaving module in accordance with another preferred embodiment of the present invention.

FIG. 11 is a schematic view illustrating the receiving principle of the Bus Converting and Bit Interleaving module in the above preferred embodiment. As shown in FIG. 11, the output of the DEMUX+CDR module 21 are separated by bit interleaving operation into two groups referred to as Group C and Group D hereinafter, which denote as 0-7 and 0'-7'. The above Traffic Encapsulating Mapping and Framing module 40' may also use byte J0 or other spare bytes of STM-16 as the identifier of low-rate frames, and decides, in the receiving process, whether the identifier of the received frame matches the identifier of the frame to be received by this module 40', if not, set the control signal of Sel0 of 2×2 crossing module 32 to control 2×2 crossing module 32 to conduct switching operation, thus matching the frame with the receiving end. Compared with the Bus Converting and Bit Interleaving module 30 shown in FIG. 4, the 1:2 de-multiplexing module 33 and the 16-input 2×2 crossing module 34 are not needed.

Since the output and input of the above module 40' are both a group of 8 parallel signals each with a rate of 311 Mb/s, and there is no 1:2 de-multiplexing process in the Bus Converting and Bit Interleaving module 30, there will be no LOF alarm caused in the 1:2 de-multiplexing process. As a result, in this embodiment, the controlling procedure to guarantee the correct receiving of multiple low-rate frames is simplified compared with the controlling procedure as shown in FIG. 5, and the procedure includes:

Step A: decide whether there is a byte J0 mismatch, if yes, proceed to Step B, otherwise terminate this procedure;

Step B: conduct an NOT operation on the signal Sel0 to make the 2×2 crossing module switch the two groups of 8-bit data signals.

In another embodiment of the present invention, Bus Converting and Byte Interleaving module 30' substitutes the Bus Converting and Bit Interleaving module 30 of the above embodiment.

Figure 12:
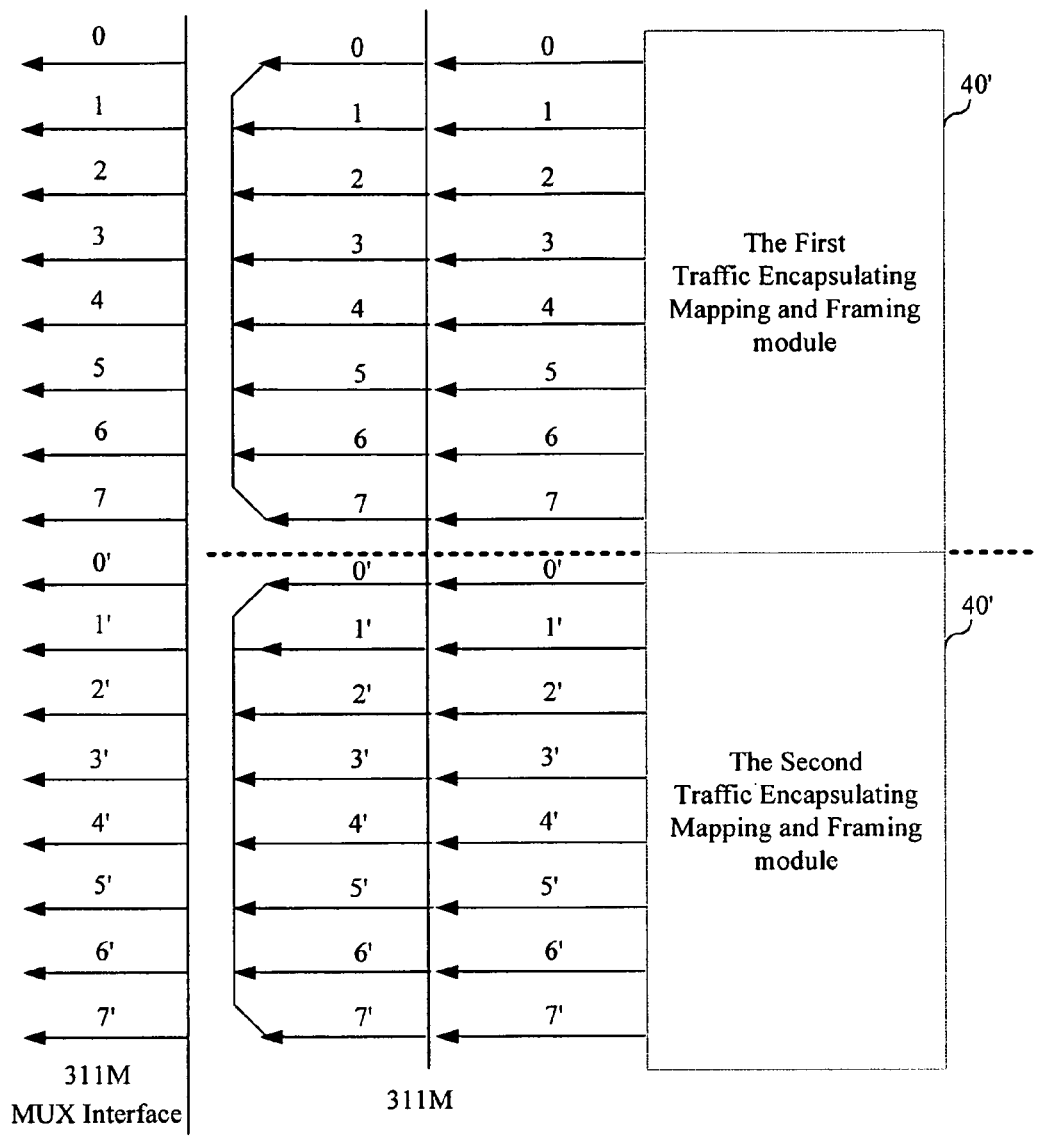
FIG. 12 is a schematic view illustrating the transmitting principle of a bus converting and byte interleaving module in accordance with another preferred embodiment of the present invention.

FIG. 12 is a schematic view illustrating the transmitting principle of the Bus Converting and Byte Interleaving module in the above preferred embodiment. As shown in FIG. 12, the firs Traffic Encapsulating Mapping and Framing module 40' and second Traffic Encapsulating Mapping and Framing module 40' output one group of 8 parallel signals each with a rate of 311 Mb/s, respectively, which are denoted as 0-7 and 0'-7', respectively. As the output of module 40' matches the input rate of the MUX module 22, the byte interleaving operation can be implemented by just inputting the outputted bytes alternately and successively from the two Traffic Encapsulating Mapping and Framing modules, i.e. the order of the signals on the input bus of MUX module 22 are successively as 0, 1, 2, 3, 4, 5, 6, 7, 0', 1', 2', 3', 4', 5', 6', 7'. In this embodiment, the Bus Converting and Byte Interleaving 30' in the transmitting direction serves only the function of connection, and therefore may be replaced by the connecting line on the circuit board. Compared with the Bus Converting and Byte Interleaving module 30' shown in FIG. 8, the 1:2 MUX module 31 is not needed.

Figure 13:
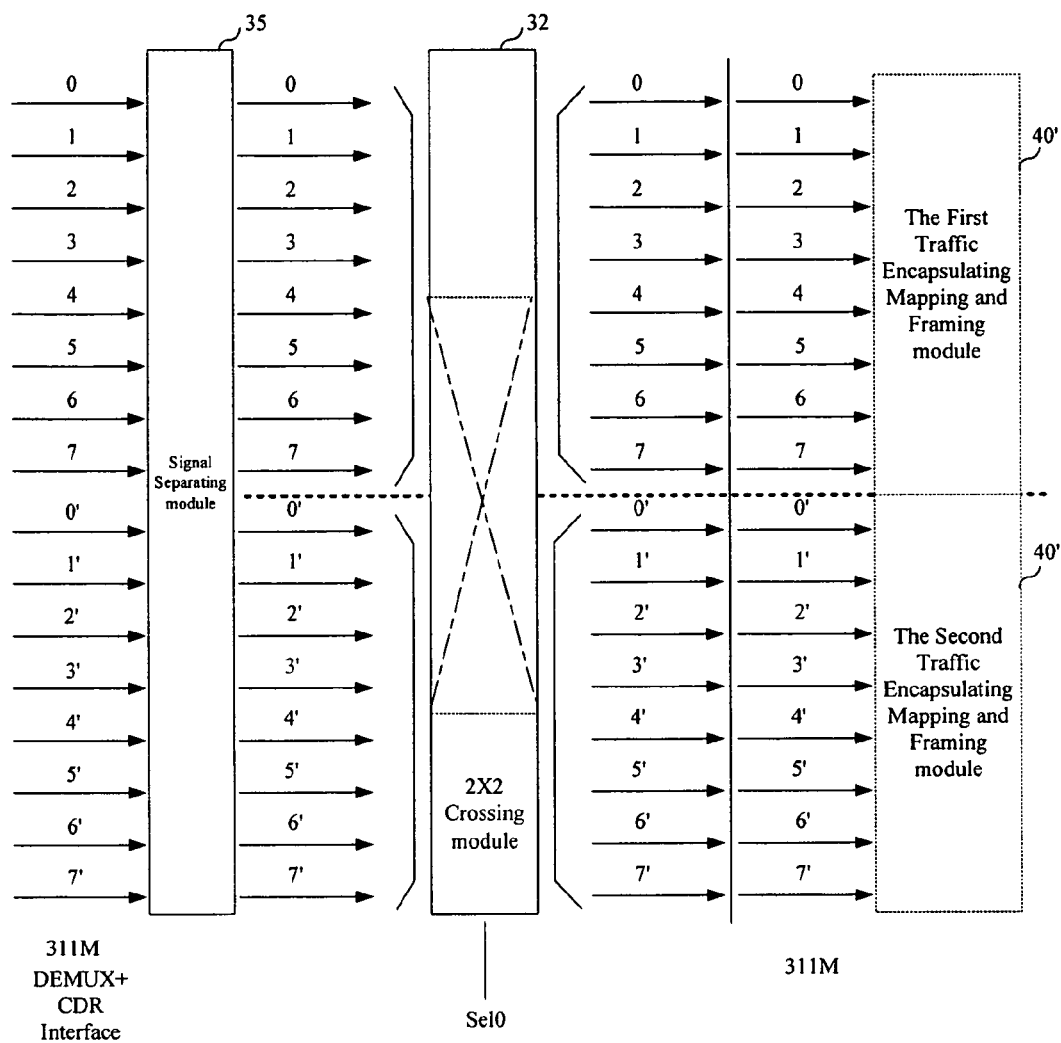
FIG. 13 is a schematic view illustrating the receiving principle of a bus converting and byte interleaving module in accordance with another preferred embodiment of the present invention.

FIG. 13 is a schematic view illustrating the receiving principle of the Bus Converting and Byte Interleaving module in the above preferred embodiment. As shown in FIG. 13, the output of the DEMUX+CDR module 21 are separated by byte interleaving operation into two groups denoted as 0-7 and 0'-7', which are hereinafter referred to as Group E and Group F. The above Traffic Encapsulating Mapping and Framing module 40' may also use byte J0 or other spare bytes of STM-16 as the identifier of low-rate frames, and decides, in the receiving process, whether the identifier of the received frame matches the identifier of the frame to be received by this module 40', if not, set the control signal of Sel0 of the 2×2 crossing module 32 to control the 2×2 crossing module 32 to conduct a switching operation and implement the matching of the data. Likewise, in order to prevent byte crossing in the two signals, a Signal Separating module 35 is added to the module 30', and the module 35 implements the separation of the first service signal from the second service signal by searching the frame aligning byte of each signal. Compared with Bus Converting and Byte Interleaving module 30' shown in FIG. 9, the 1:2 de-multiplexing module 33 and the 16-input 2×2 crossing module 34 are not needed.

In another preferred embodiment of the present invention, an FEC coding module is added between the Optical Transmitting module 12 and the MUX module 22, for conducting an FEC coding of the signals from the MUX module 22, and then transmitting the coded signals to external fibres via the Optical Transmitting module 12. In addition, an FEC decoding module is added between the Optical Receiving module 11 and the CDR+DEMUX module 21, for conducting an FEC decoding of the signals from the Optical Transmitting module 12, and then transmitting the decoded signals to the CDR+DEMUX module 21. By adding an FEC coding module and an FEC decoding module, error codes can be effectively reduced in fibre transmission and the transmission range can be increased.

In the above embodiment, the working principle of the sub-rate multiplexing/ de-multiplexing apparatus for multiplexing 4 GE optical signals into one optical signal with a rate of 5 Gb/s rate-class is described. In another embodiment, a sub-rate multiplexing/de-multiplexing apparatus multiplexes the inputted 2 STM-16 optical signals directly into one optical signal with a rate of 5 Gb/s rate-class.

Figure 14:
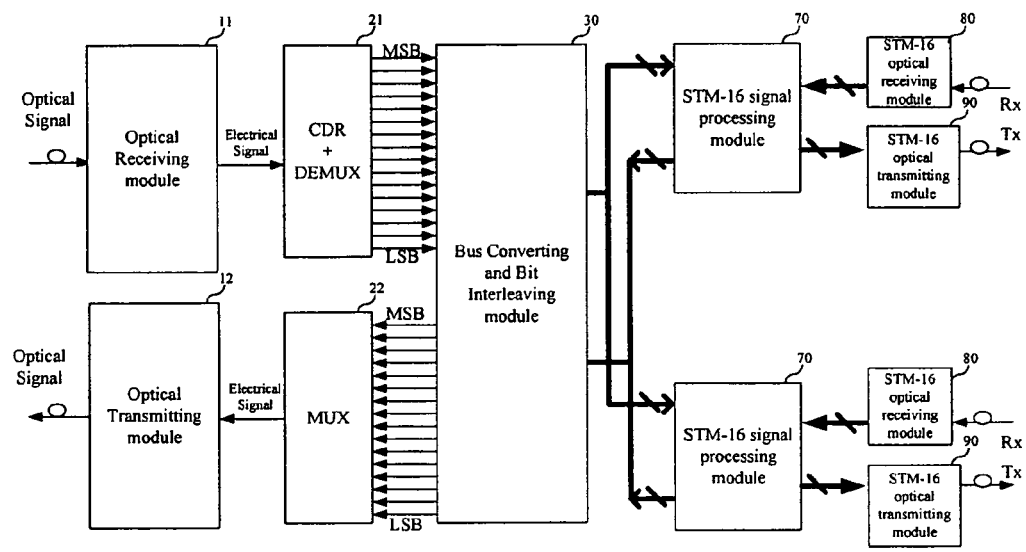
FIG. 14 is a diagram illustrating the structure of a sub-rate multiplexing/de-multiplexing device in accordance with still another preferred embodiment of the present invention.

FIG. 14 is a diagram illustrating the structure of the sub-rate multiplexing/ de-multiplexing apparatus in accordance with the above preferred embodiment. As shown in FIG. 14, the sub-rate multiplexing/de-multiplexing apparatus that multiplexes 2 STM-16 optical signals directly into one optical signal with a rate of 5 Gb/s rate-class, like the sub-rate multiplexing/de-multiplexing apparatus shown in FIG. 2 or FIG. 6, includes an Optical Receiving module 11, an Optical Transmitting module 12, a CDR+DEMUX module 21, a MUX module 22, a bus converting and interleaving module 30 and 30', and the functions of such modules remain unchanged. The bus converting and interleaving modules 30 and 30' may adopt the bit interleaving mode or the byte interleaving mode.

The difference between the above sub-rate multiplexing/de-multiplexing apparatus of the above embodiment and that in this embodiment is that the sub-rate multiplexing/de-multiplexing apparatus in this embodiment also includes two identical STM-16 signal processing modules 70, two identical STM-16 optical receiving modules 80 and two identical STM-16 optical transmitting modules 90.

In the transmitting direction, STM-16 optical receiving module 80 conducts an optical/electrical conversion of the externally-received STM-16 optical signals, generates STM-16 electrical signals, and transmits the signals to the STM-16 signal processing module 70;

The STM-16 signal processing module 70 conducts frame alignment, overhead processing and performance monitoring operations on the received STM-16 electrical signals, and outputs parallel STM-16 signals to the bus converting and interleaving modules 30 and 30';

In the receiving direction, the STM-16 signal processing module 70 receives parallel STM-16 signals outputted from the bus converting and interleaving modules 30 and 30', conducts frame alignment, overhead processing and performance monitoring operations, and outputs STM-16 electrical signals to the STM-16 optical transmitting module 90;

After receiving the STM-16 electrical signals, the STM-16 optical transmitting module 90 conducts an electrical/optical conversion, and outputs the signals to external optical fibres.

The STM-16 signal processing module 70, the STM-16 optical receiving module 80, and the STM-16 optical transmitting module 90 in this embodiment may be seen as a 2.5 Gb/s transmission module.

In addition, the sub-rate multiplexing/de-multiplexing apparatus in this embodiment may also further include an FEC coding module between the Optical Transmitting module 12 and the MUX module 22, and an FEC decoding module between the Optical Receiving module 11 and the CDR+DEMUX module 21 for conducting an FEC coding/decoding so as to effectively reduce error codes in fibre transmission and increase the transmission range of the signals in the fibres.

In yet another preferred embodiment of the present invention, the sub-rate multiplexing/de-multiplexing apparatus may multiplex 4 GE signals directly into one signal with a rate of 5 Gb/s rate-class.

The sub-rate multiplexing/de-multiplexing apparatus in this embodiment has basically the same part as that shown in FIG. 2, and comprises the Optical Receiving module, the Optical Transmitting module, the CDR+DEMUX module, the MUX module, the bus converting and interleaving module, the Traffic Encapsulating Mapping and Framing module, four GE PHY modules, and four GE Optical Transceivers.

The Traffic Encapsulating Mapping and Framing module is used for directly multiplexing 4 GE signals, encapsulating, mapping the signals, and generating a 5 Gb/s rate-class signal in the transmitting direction, while in the receiving direction, for de-mapping a received 5 Gb/s rate-class signal, de-encapsulating the signal, and de-multiplexing the signal into 4 GE signals. The functions of other modules remain unchanged.

The bus converting and interleaving module may likewise adopt the bit interleaved or byte interleaved multiplexing/de-multiplexing method, and the present invention sets no limit to the multiplexing/de-multiplexing method adopted.

In addition, the encapsulating, mapping and de-mapping, de-encapsulating may also be conducted in various ways, and the present invention sets no limit to such ways, either.

It should be noted that the sub-rate multiplexing/de-multiplexing apparatus may be separated into sub-rate multiplexing apparatus and sub-rate de-multiplexing apparatus, which are used in the transmitting and receiving processes independently.

The present invention also provides an optical communication system constructed by the above sub-rate multiplexing/de-multiplexing apparatus, and this system can implement a 5 Gb/s transmission rate.

The optical communication system in accordance with the present invention includes an optical transmitting unit and an optical receiving unit, wherein the optical transmitting unit converts an input electrical signal into an optical signal and transfers the signal to the optical receiving unit via optical fibres; and the optical receiving unit converts the received optical signal into an electrical signal and outputs the electrical signal. The rate-class of the optical signal transferred in the fibres is 5 Gb/s. The optical transmitting unit and optical receiving unit include the sub-rate multiplexing/de-multiplexing apparatus.

In a preferred embodiment of the present invention, the data transmission rate of at least one wavelength in a WDM system is in the 5 Gb/s rate-class. Refer to the typical WDM system shown in FIG. 1. Compared with the optical communication system in accordance with the present invention, the existing WDM system, as shown in FIG. 1, is different in comprising at least one pair of OTU which transmits and receives optical signals with a rate of 5 Gb/s.

In the embodiment, the above WDM system includes multiple pairs of OTU, one wave-multiplexer, one wave-demultiplexer, and optical fibres; wherein at least one OTU includes the sub-rate multiplexing/de-multiplexing apparatus.

The dynamic working process of the optical communication system in the above embodiment is as follows: in the transmitting direction, when a group of low-rate signals are inputted to the OTU before the wave-multiplexer, this group of low-rate signals will be converted by the sub-rate multiplexing/de-multiplexing apparatus in the OTU into an optical signal with the rate-class of a certain wavelength (assumed as wavelength A) being 5 Gb/s, then be combined by the wave-multiplexer with the single-wavelength optical signals from other OTU, and be transferred via one optical fibre to the wave-demultiplexer in the destination node. There may be several OAs in the transmission to amplify the wave-combined optical signals. In the receiving direction, the wave-demultiplexer separates optical signals of different wavelengths, the optical signal of wavelength A is sent to an OTU, and the sub-rate multiplexing/de-multiplexing apparatus in this OTU converts this optical signal with a rate of 5 Gb/s into a group of low-rate signals. In this way, the data are successfully transferred from a source node to a destination node. By using a 5 Gb/s rate-class to transfer a service, each wavelength can transfer two times of services that a wavelength of a 2.5 Gb/s rate-class can transfer while the cost does not increase much higher, which effectively raises the utility efficiency of wavelength and reduces the total cost of network construction. Meanwhile, as the dispersion-limited range of the signals of 5 Gb/s rate-class is up to 240 kilometers or so, the problem that the transmission range of the 10 Gb/s rate-class signals is short can be solved so as to meet the range requirement of a MAN.

It should be noted in addition that the present invention is not only applicable to point-to-point chain networks as shown in FIG. 1, but also applicable to such network topology as chain networks and ring networks comprising optical Add Drop Multiplexers (ADM).

As can be seen from the optical communication system, the sub-rate multiplexing/de-multiplexing module as well as the method for data multiplexing/de-multiplexing described in the above embodiments, the present invention makes it possible to multiplex and converge multi low-rate signals into one signal with a rate of the 5 Gb/s rate-class for transmission in a MAN, which meets the requirement on the transmission range by a MAN while raising the utility efficiency of a single wavelength.

The purpose, technical solution and merits of the present invention have been further described in detail by the above preferred embodiments. It should be appreciated that the foregoing presents only preferred embodiments of the present invention and is not for use in limiting the invention. Any modification, equivalent substitution, and improvement within the spirit and principle of the invention should be covered in the protection scope of the invention.

The invention claimed is:

1. A data transmission method, comprising:

creating different identifiers for each transmitting end and each receiving end for indicating the corresponding relationship between the transmitting end and the receiving end;

adding to each low-rate service signal the identifier of the transmitting end thereof; multiplexing and converting more than one low-rate service signal into an optical signal with a transmission rate of about 5 Gb/s, and transferring the optical signal with the transmission rate of about 5 Gb/s to a destination node;

converting the received optical signal with the transmission rate of about 5 Gb/s into an electrical signal and de-multiplexing the electrical signal to obtain more than one low-rate service signal;

a1. deciding according to the identifier set by the transmitting end whether the receiving end is corresponding to the transmitting end, if it is, the receiving end receives the more than one low-rate service signal; otherwise, proceeding to a2; and a2. switching an order of the more than one of low-rate service signals, and the receiving end receives the switched signals.

2. The method according to claim 1, wherein the identifier is denoted by byte J0 or other spare bytes of SDH.

3. A multiplexing apparatus, comprising: a 2.5 Gb/s data transmission module, a bus converting and interleaving module, a multiplexing module, and an optical transmitting module; wherein the 2.5 Gb/s data transmission module comprises two GE Optical Transceiving modules, two GE Physical Layer Interface modules and one Traffic Encapsulating Mapping and Framing module; wherein the two GE Optical Transceiving modules, each of which is adapted to convert a GE service optical signal into a GE physical-layer serial electrical signal, and output the GE physical-layer serial electrical signal to one of the two GE Physical Layer Interface modules;

the two GE Physical Layer Interface modules, each of which is adapted to convert the GE physical-layer serial electrical signal into a GE physical-layer electrical signal conforming to a gigabit media-independent interface, and output the GE physical-layer electrical signal to the Traffic Encapsulating Mapping and Framing module;

the Traffic Encapsulating Mapping and Framing module is adapted to encapsulate and map two GE physical-layer electrical signals, convert the two GE physical-layer electrical signals into a group of parallel electrical signals with a total rate of about 2.5 Gb/s, and output the group of the parallel electrical signals with the total rate of about 2.5 Gb/s to the bus converting and interleaving module;

the bus converting and interleaving module is adapted to convert more than one groups of the parallel electrical signals with the total rate of about 2.5 Gb/s into one group of parallel electrical signals with a total rate of about 5 Gb/s, and output the group of the parallel electrical signals with the total rate of about 5 Gb/s to the multiplexing module;

the multiplexing module is adapted to convert the group of the parallel electrical signals with the total rate of about 5 Gb/s into a serial electrical signal with a rate of about 5 Gb/s, and output the serial electrical signal with the rate of about 5 Gb/s to the optical transmitting module; and the optical transmitting module is adapted to convert the serial electrical signal with the rate of about 5 Gb/s into an optical signal with a rate of about 5 Gb/s, and output the optical signal with the rate of about 5 Gb/s to a transmission optical fibre.

4. A multiplexing apparatus, comprising: a 2.5 Gb/s data transmission module, a bus converting and interleaving module, a multiplexing module, and an optical transmitting module; wherein the 2.5 Gb/s data transmission module comprises an STM-16 optical receiving module and an STM-16 signal processing module; wherein the STM-16 optical receiving module is adapted to convert an STM-16 optical signal into a service electrical signal, and transmit the service electrical signal to the STM-16 signal processing module;

the STM-16 signal processing module is adapted to conduct frame alignment and overhead processing for the service electrical signal, generate a group of parallel electrical signals with a total rate of about 2.5 Gb/s, and output the group of the parallel electrical signals with the total rate of about 2.5 Gb/s to the bus converting and interleaving module;

the bus converting and interleaving module is adapted to convert more than one groups of the parallel electrical signals with the total rate of about 2.5 Gb/s into one group of parallel electrical signals with a total rate of about 5 Gb/s, and output the group of the parallel electrical signals with the total rate of about 5 Gb/s to the multiplexing module;

the multiplexing module is adapted to convert the group of the parallel electrical signals with the total rate of about 5 Gb/s into a serial electrical signal with a rate of about 5 Gb/s, and output the serial electrical signal with the rate of about 5 Gb/s to the optical transmitting module; and the optical transmitting module is adapted to convert the serial electrical signal with the rate of about 5 Gb/s into an optical signal with a rate of about 5 Gb/s, and output the optical signal with the rate of about 5 Gb/s to a transmission optical fibre.

5. A de-multiplexing apparatus, comprising: an Optical Receiving module, a Clock and Data Recovery+De-multiplexing (CDR+DEMUX) module, and a bus converting and interleaving module; wherein the Optical Receiving module is adapted to convert an optical signal with a rate of about 5 Gb/s into an electrical signal with a rate of about 5 Gb/s, and output the electrical signal with the rate of about 5 Gb/s to the CDR+DEMUX module;

the CDR+DEMUX module is adapted to conduct clock extraction, data recovery, signal de-multiplexing and serial/parallel conversion of the electrical signal with the rate of about 5 Gb/s, generate a group of parallel electrical signals with a total rate of about 5 Gb/s, and output the group of the parallel electrical signals with the total rate of about 5 Gb/s to the bus converting and interleaving module; and the bus converting and interleaving module comprises a 2×2 crossing module, is adapted to convert the group of the parallel electrical signals with the total rate of about 5 Gb/s into more than one group of parallel signals with a total rate of about 2.5 Gb/s, and output the parallel electrical signals with the total rate of about 2.5 Gb/s.

6. A de-multiplexing apparatus, comprising: an Optical Receiving module, a Clock and Data Recovery+De-multiplexing (CDR+DEMUX) module, a bus converting and interleaving module, and a 2.5 Gb/s data transmission module; wherein the Optical Receiving module is adapted to convert an optical signal with a rate of about 5 Gb/s into an electrical signal with a rate of about 5 Gb/s, and output the electrical signal with the rate of about 5 Gb/s to the CDR+DEMUX module;

the CDR+DEMUX module is adapted to conduct clock extraction, data recovery, signal de-multiplexing and serial/parallel conversion of the electrical signal with the rate of about 5 Gb/s, generate a group of parallel electrical signals with a total rate of about 5 Gb/s, and output the group of the parallel electrical signals with the total rate of about 5 Gb/s to the bus converting and interleaving module;

the bus converting and interleaving module is adapted to convert the group of the parallel electrical signals with the total rate of about 5 Gb/s into more than one group of parallel electrical signals with the total rate of about 2.5 Gb/s, and output the parallel electrical signals with the total rate of about 2.5 Gb/s to the 2.5 Gb/s data transmission module;

the 2.5 Gb/s data transmission module comprises: one Traffic Encapsulating Mapping and Framing module, two GE Physical Layer Interface modules, and two GE Optical Transceiving modules; wherein the Traffic Encapsulating Mapping and Framing module is adapted to frame-search, de-map and de-encapsulate the group of the parallel electrical signals with the total rate of about 2.5 Gb/s, and output two GE physical-layer electrical signals conforming to a gigabit media-independent interface, respectively, to the two GE Physical Layer Interface modules;

the two GE Physical Layer Interface modules, each of which is adapted to convert the GE physical-layer electrical signal into a GE physical-layer serial electrical signal, and output the GE physical-layer serial electrical signal to one of the two GE Optical Transceiving modules; and the two GE Optical Transceiving modules, each of which is adapted to convert the GE physical-layer serial electrical signal into a GE service optical signal, and output the GE service optical signal.

7. A de-multiplexing apparatus, comprising: an Optical Receiving module, a Clock and Data Recovery+De-multiplexing (CDR+DEMUX) module, a bus converting and interleaving module, and a 2.5 Gb/s data transmission module; wherein the Optical Receiving module is adapted to convert an optical signal with a rate of about 5 Gb/s into an electrical signal with a rate of about 5 Gb/s, and output the electrical signal with the rate of about 5 Gb/s to the CDR+DEMUX module;

the CDR+DEMUX module is adapted to conduct clock extraction, data recovery, signal de-multiplexing and serial/parallel conversion of the electrical signal with the rate of about 5 Gb/s, generate a group of parallel electrical signals with a total rate of about 5 Gb/s, and output the group of the parallel electrical signals with the total rate of about 5 Gb/s to the bus converting and interleaving module;

the bus converting and interleaving module is adapted to convert the group of the parallel electrical signals with the total rate of about 5 Gb/s into more than one group of parallel electrical signals with the total rate of about 2.5 Gb/s, and output the parallel electrical signals with the total rate of about 2.5 Gb/s to the 2.5 Gb/s data transmission module;

the 2.5 Gb/s data transmission module comprises an STM-16 signal processing module and an STM-16 optical transmitting module; wherein the STM-16 signal processing module is adapted to conduct frame alignment, overhead processing and performance monitoring operations for the parallel electrical signals with the total rate of about 2.5 Gb/s, generate a service electrical signal, and output the service electrical signal to the STM-16 optical transmitting module; and the STM-16 optical transmitting module is adapted to convert the service electrical signal into an STM-16 optical signal, and output the STM-16 optical signal.

8. An optical communication system, comprising: an optical transmitting unit and an optical receiving unit connected by optical fibres; wherein the optical transmitting unit comprises a sub-rate multiplexing apparatus; the sub-rate multiplexing apparatus comprises a low-rate signal transmission module, a bus converting and interleaving module, a multiplexing module, and an optical transmitting module; wherein the low-rate signal transmission module is adapted to convert more than one low-rate service optical signals into more than one low-rate parallel electrical signals, and output the more than one low-rate parallel electrical signals to the bus converting and interleaving module;

the bus converting and interleaving module is adapted to convert the more than one low-rate parallel electrical signals into one group of parallel electrical signals with a total rate of about 5 Gb/s, and output the group of the parallel electrical signals with the total rate of about 5 Gb/s to the multiplexing module;

the multiplexing module is adapted to convert the group of the parallel electrical signals with the total rate of about 5 Gb/s into a serial electrical signal with a rate of about 5 Gb/s, and output the serial electrical signal with the rate of about 5 Gb/s to the optical transmitting module;

the optical transmitting module is adapted to convert the serial electrical signal with the rate of about 5 Gb/s into an optical signal with a rate of about 5 Gb/s and output the optical signal with the rate of about 5 Gb/s to an external optical fibre;

the optical receiving unit comprises a sub-rate de-multiplexing apparatus; the sub-rate de-multiplexing apparatus comprises an low-rate signal receiving module, a Clock and Data Recovery+De-multiplexing (CDR+DEMUX) module, a bus converting and interleaving module, and a low-rate signal transmission module; wherein the low-rate signal receiving module is adapted to convert the optical signal with the rate of about 5 Gb/s into a serial electrical signal with a rate of about 5 Gb/s, output the serial electrical signal with a rate of about 5 Gb/s to the CDR+DEMUX module;

the CDR+DEMUX module is adapted to conduct clock extraction, data recovery, signal de-multiplexing and serial/parallel conversion of the serial electrical signal with a rate of about 5 Gb/s, generate a group of parallel electrical signals with a total rate of about 5 Gb/s, and output the group of the parallel electrical signals with the total rate of about 5 Gb/s to the bus converting and interleaving module;

the bus converting and interleaving module is adapted to convert the group of parallel electrical signals with the total rate of about 5 Gb/s into more than one low-rate parallel electrical signals, and output the more than one low-rate parallel electrical signals to the low-rate signal transmission module; and the low-rate signal transmission module is adapted to convert the more than one low-rate parallel electrical signals outputted into more than one low-rate service optical signals, and output the service optical signals.

9. The optical communication system according to claim 8, wherein the bus converting and interleaving module refers to a Bus Converting and Bit Interleaving module or a Bus Converting and Byte Interleaving module.

* * * * *